Figure 1:
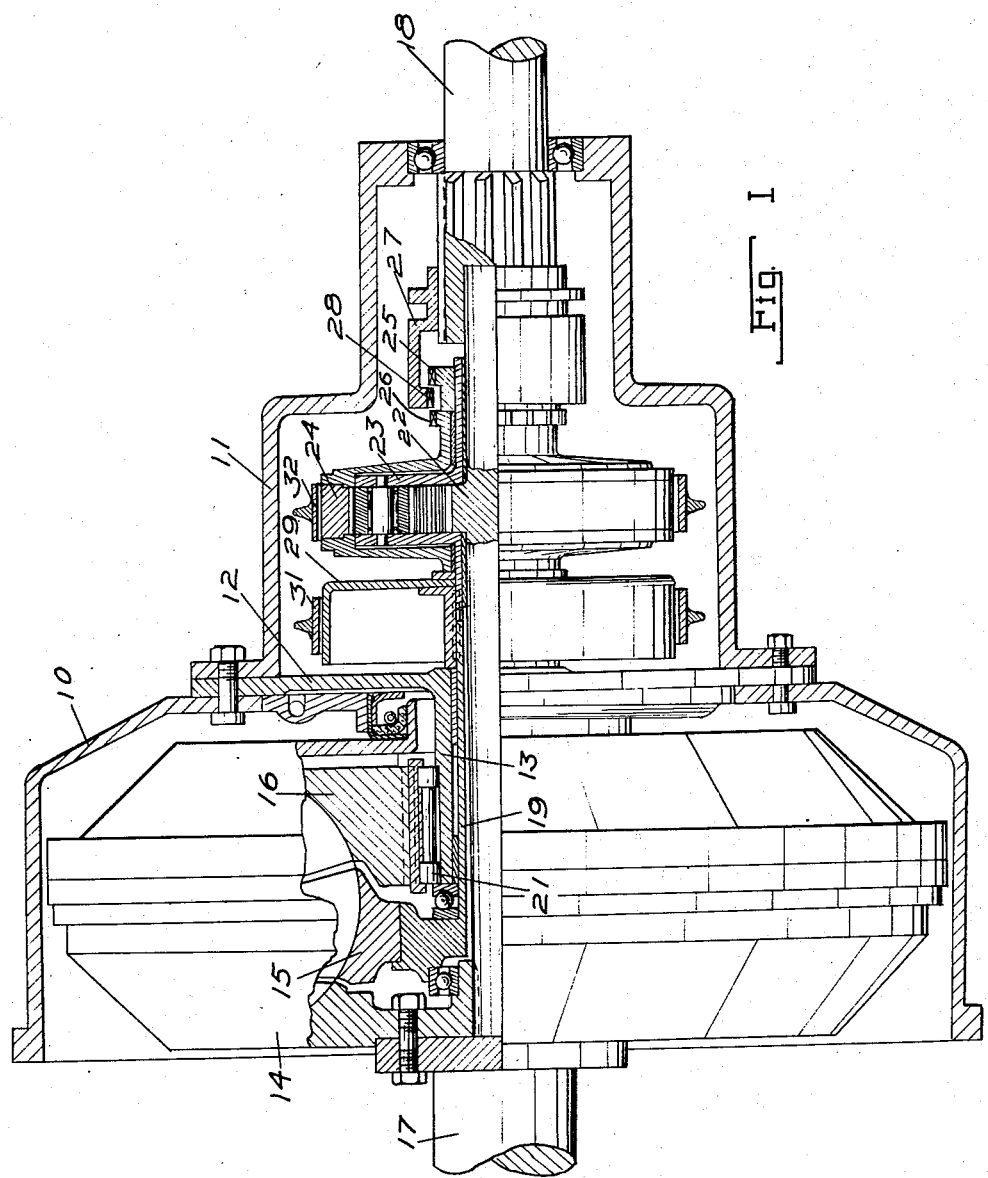

April 9, 1940.  A. Y. DODGE  2,196,660
TRANSMISSION
Filed Oct. 14, 1935  2 Sheets-Sheet 1

INVENTOR.
ADIEL Y. DODGE
BY McConkey & Booth
ATTORNEYS.

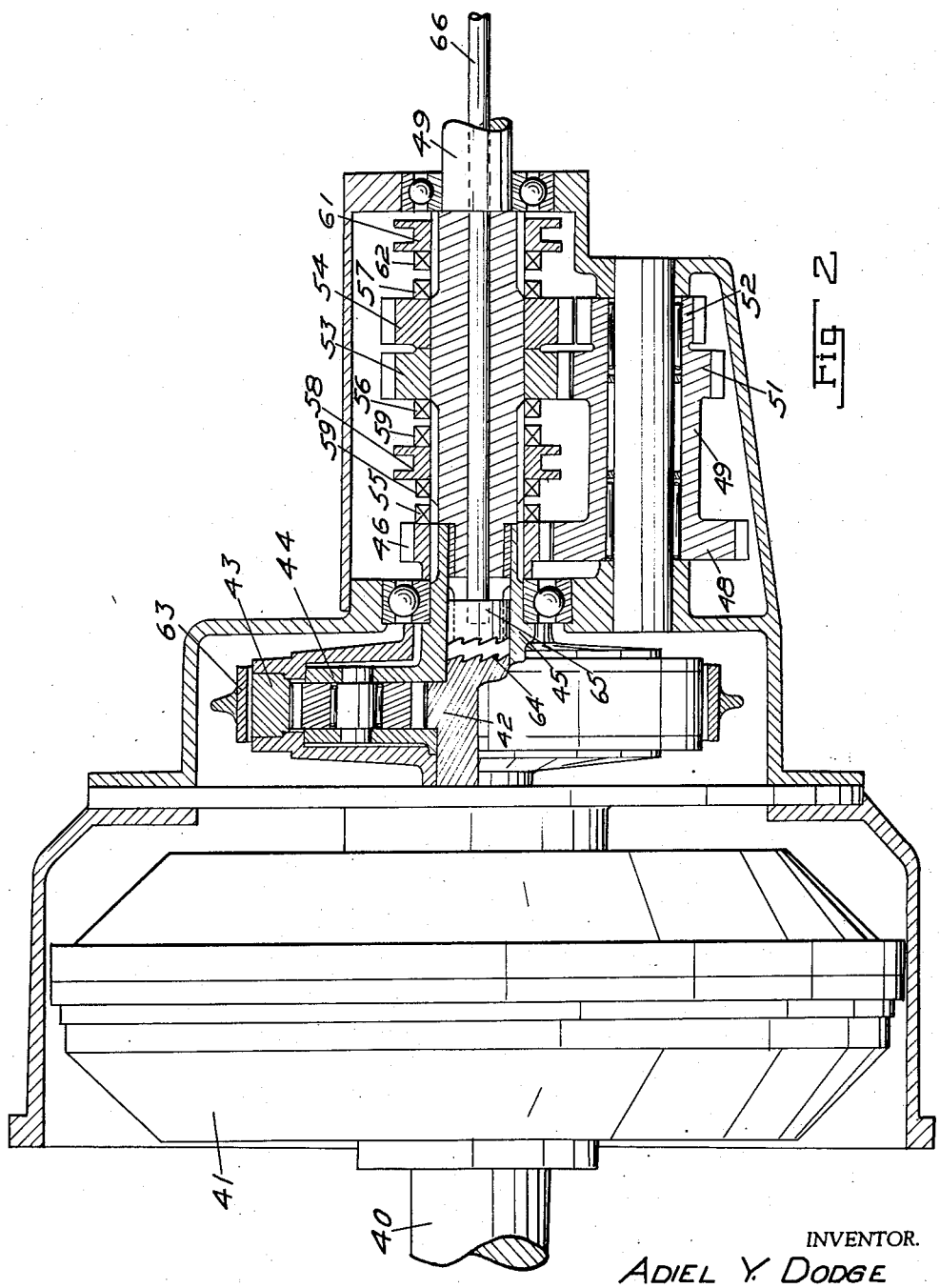

Patented Apr. 9, 1940

2,196,660

UNITED STATES PATENT OFFICE 2,196,660

TRANSMISSION

Adiel Y. Dodge, South Bend, Ind.

Application October 14, 1935, Serial No. 44,848

16 Claims. (Cl. 74—189.5)

This invention relates to transmissions and more particularly to transmissions employing both a hydraulic torque converter and a gear chain.

One of the objects of the invention is to provide a transmission which will operate throughout a wide range of speed and torque ratios at high efficiency and which is simple in construction and operation.

Another object is to provide a transmission in which the usual friction clutch between the engine and transmission is eliminated.

One embodiment of the invention for carrying out the above and other objects comprises a hydraulic torque converter including an impeller connected to a driving shaft and a driven rotor and a differential gear chain having two elements thereof connected to the driving shaft and the rotor respectively. One of said two elements and a third element of the gear chain may be directly connected to the driven shaft selectively to provide either forward or reverse drive or the third element may be connected to the driven shaft through a shiftable gear chain similar to a standard selective transmission.

Preferably brake means are provided for engaging elements of the gear chain to provide reverse drive and/or to facilitate shifting of the selective connections. One advantageous form of brake means is a friction band brake surrounding and engageable with the ring gear of the differential gear chain. The transmission also preferably includes a clutch for directly connecting the driving and driven shafts at will.

Other objects, advantages and novel features of the invention will be apparent from the following description when read in connection with the accompanying drawings, in which:

Figure 1 is a central longitudinal section with parts in elevation of a transmission embodying the invention, and Figure 2 is a view similar to Figure 1 showing a modified construction.

The transmission of Figure 1 is particularly adapted for use in an automotive vehicle and comprises a housing 10 which may be connected to an engine crankcase or mounted in any other desired manner. A housing 11 is secured to the housing 10 and between the two housings there is secured an annular disc 12 carrying a sleeve 13.

A hydraulic torque converter is mounted in the housing 10 and includes a vaned impeller 14 which preferably extends over and forms a casing for the torque converter, a vaned rotor 15, and a vaned stator 16. A driving shaft 17 which may be the crankshaft of an internal combustion engine is connected to the impeller and has an extension running substantially completely through the transmission and journaled in a driven shaft 18. The rotor 15 is supported on a sleeve 19 surrounding and rotatable on the driving shaft and preferably also journaled in the sleeve 13. The stator 16 is mounted on the sleeve 13 on a combined one-way brake and bearing 21 which may take the form of that shown in my copending application Serial No. 39,674. The torque converter has not been shown in detail herein but it may take the form of any of the torque converters shown in my copending applications Serial Nos. 723,083, 34,303 or 3,544.

The torque converter is connected to the driven shaft through a differential gear chain shown as comprising a sun gear 22 formed on or secured to the driving shaft, a planet carrier 23 carrying a double set of planet gears, and a ring gear 24. Both the gear carrier and ring gear are freely mounted on the driving shaft and the gear carrier is connected to the sleeve 19 and the rotor 15.

In order to connect the gear chain to the driven shaft, the gear carrier is connected to a clutch member 25 and the ring gear to a clutch member 26. The driven shaft 18 is splined at its end and a collar 27 having an internal clutch member 28 adapted to mesh with the clutch members 25 and 26 is slidable on the splines on the driven shaft. The collar 27 may be shifted axially by any suitable control means, not shown, to move the clutch 28 selectively into engagement with either of the clutches 25 or 26 or out of engagement with both of them as shown.

To facilitate shifting of the clutch 28 into engagement with the clutches 25 and 26, the sleeve 19 preferably carries a brake drum 29 adapted to be engaged by a brake band 31 which may be operated by a pedal similar to a conventional clutch pedal. When this brake is engaged, the rotor 15 and the clutch 25 will be stopped, thereby permitting the clutch 28 to be engaged with the clutch 25 easily.

A similar brake band 32 surrounds and is adapted to engage the ring gear 24, for producing reverse drive as will appear hereinafter.

When it is desired to shift the clutch 28 into engagement wtih the clutch 26 the brake 32 may be engaged to retard or stop the clutch 26. Since this shifting is usually performed when the driven shaft and hence the clutch 28 is stationary the two clutches 26 and 28 may shift into engagement readily. Likewise when it is desired to engage the clutches 28 and 25 the brake 31 may be engaged to retard or stop the clutch 25.

With the parts in the position shown, there is no driving connection between the driving and driven shafts and this position may be considered neutral. When the clutch 28 is shifted into engagement with the clutch 26, which is the forward position, rotation of the sun gear 22 tends to turn the ring gear forwardly through the double planet gears. If the resistance to rotation of the driven shaft is sufficiently greater than the torque exerted by the torque converter, the planet carrier and the rotor 15 will be turned backwards until engine speed is increased sufficiently to produce enough torque in the torque converter to decrease the reverse rotation of the gear carrier at which time the driven shaft will start turning forwardly at reduced speed. As engine speed increases and/or driven shaft resistance decreases the rotor and gear carrier will start turning forwardly until finally they reach the speed of the driving shaft, at which time the gearing will rotate as a unit and the driving ratio will be one to one.

It will be apparent that if quicker starting at low gear drive is desired, the brake 31 may be engaged to lock the gear carrier and produce a positive gear drive between the sun gear and the ring gear. The brake will, of course, be released after sufficient speed has been attained to enable the torque converter to drive the gear carrier forwardly. The brake 31 will also be engaged when it is desired to utilize the engine braking effect in low gear, an increased braking being produced in the torque converter due to holding the rotor stationary.

To reverse, the clutch 28 is shifted into engagement with the clutch 25, the brake 32 simultaneously being engaged with the ring gear 24. Preferably a single control is provided for simultaneously effecting both of these operations although separate controls might be used. Due to the double planet gears, the gear carrier and driven shaft will be rotated reversely by the sun gear at reduced speed.

Figure 2 illustrates a modification including a driving shaft 40 connected to the impeller of a torque converter 41 and to a sun gear 42 of a planetary gear chain. The planetary gear chain includes a ring gear 43 connected to the rotor of the torque converter and a planet carrier 44 carrying a single set of planet gears meshing with the sun and ring gears.

The planet carrier terminates in a sleeve 45 to which a spur gear 46 is secured and in the end of which the end of a driven shaft 47 is journaled. The gear 46 is constantly in mesh with a gear 48 on a lay shaft 49 which also carries gears 51 and 52. The gear 51 is in constant mesh with a gear 53 freely rotatable on the driven shaft and the gear 52 meshes through a reverse idler, not shown, with a gear 54 which is also freely rotatable on the driven shaft.

In order to form driving connections with the driven shaft, the gears 46, 53 and 54 are provided with dog clutches 55, 56 and 57 respectively. A collar 58 splined on the driven shaft carries a pair of oppositely facing dog clutches 59 adapted to engage with the clutches 55 and 56 and a similar collar 61 carries a dog clutch 62 adapted to engage with the clutch 57. The collars 58 and 61 are preferably controlled through a single shift lever, not shown, in such a manner that only one of them can be moved into operative position at a time.

In order to facilitate shifting of the clutches, a hand brake 63 surrounds and is engageable with the ring gear 43. This brake may be operated by a pedal similar to a conventional clutch pedal. The brake is preferably so mounted as to allow a limited amount of movement, as through springs or the like. Thus when the clutches are moved into engagement the ring gear may rotate reversely a limited amount to permit complete engagement of the clutches before any substantial load is placed thereon.

The position shown is the neutral position in which there is no driving connection to the driven shaft. For low speed forward drive the collar 58 is shifted to bring one of the clutches 59 into engagement with the clutch 56, thereby connecting the gear 53 to the driven shaft. In this position the sun gear will be turned forwardly and the ring gear and rotor will be turned reversely until the torque converter develops enough torque to overcome the resistance of the driven shaft through the gear chain. If positive low gear starting is desired, the brake 63 may be engaged until the torque converter develops enough torque to turn the ring gear forwardly, thereby holding the ring gear against reverse rotation and producing a positive drive. In either event the gear 46 will be rotated forwardly to rotate gears 48 and 51 reversely and gear 53 and the driven shaft forwardly at reduced speed. The maximum torque increase will be equal to the product of the torque increase in the torque converter and planetary gear chain system times the torque increase in the selective gear chain and will vary progressively from that value to that in the selective gear chain alone as the drive in the torque converter system reaches one to one.

For high speed forward drive the collar 58 is shifted to bring one of the clutches 59 into engagement with the clutch 55, thereby connecting the driven shaft directly to the gear 46 and to the planet carrier 44. At this time the selective gear chain is ineffective and the driving ratio is governed solely by the torque converter and planetary gear chain system, varying from the maximum of which this system is capable to one to one.

If it is desired to lock out the torque converter to provide direct mechanical drive therethrough, the end of the driving shaft may be formed with a set of clutch teeth 64 and a similar set of teeth may be provided on a block 65 which is splined in the sleeve 45. To control the block 65 the driven shaft 47 may be made hollow to slidably receive a rod 66 which is connected to the block 65 and which may be controlled in any desired manner. In the position shown the block is ineffective but when it is shifted to bring the clutch teeth thereon into engagement with the clutch teeth 64 a direct mechanical connection is effected between the driving shaft and the sleeve 45.

For reverse drive the collar 61 is shifted to engage the clutches 57 and 62. The gear 46 will be driven in the same manner as described above to turn the gear 48 and lay shaft 49 reversely. However, the drive from gear 52 to gear 54 is again reversed through the idler, not shown, so that the gear 54 and the driven shaft will be driven in a reverse direction to the gear 46 and the driving shaft.

While two embodiments of the invention have been shown and described, it will be apparent that the same is susceptible of many changes and it is not intended to be limited to the forms shown or otherwise than by the terms of the appended claims.

I claim:

1. A transmission comprising, a hydraulic torque converter having a vaned stator, a vaned rotor and a vaned impeller, said impeller being connected to a source of power and a differential gear chain having one element permanently connected to the impeller and another element permanently connected to the rotor, a driven shaft, means connecting the driven shaft to a third element of said gear chain, friction brake means permanently connected to said other gear element and stationary friction means engageable with said friction brake means.

2. A transmission comprising, a hydraulic torque converter having a vaned stator, a vaned rotor and a vaned impeller said impeller being connected to a source of power, a planetary gear chain having its sun gear permanently connected to the impeller and including gear carrier and ring gear elements, means connecting the rotor to one of said elements, a driven shaft, means connecting the driven shaft to the other of said elements and a friction brake surrounding and engageable with the ring gear.

3. A transmission comprising a hydraulic torque converter having a vaned stator, a vaned rotor and a vaned impeller said impeller being connected to a source of power and a differential gear chain having one element connected to the impeller and another element connected to said rotor, a driven shaft, shiftable clutch means for variably connecting the driven shaft to the gear chain to provide different driving connections, and a brake connected to said other element of the gear chain.

4. A transmission for connecting a driving shaft to a driven shaft comprising a hydraulic torque converter having an impeller connected to the driving shaft, and a driven rotor, a differential gear chain having one element connected to the driving shaft, means for selectively connecting two other elements of the gear chain to the driven shaft and the rotor respectively, and brake means associated with each of said other elements.

5. A transmission for connecting a driving shaft to a driven shaft comprising a hydraulic torque converter having an impeller connected to the driving shaft and a driven rotor, a differential gear chain having one element connected to the driving shaft, means for selectively connecting two other elements of the gear chain to the driven shaft and the rotor respectively, and friction brakes operable selectively to brake either of said other elements.

6. A transmission for connecting a driving shaft to a driven shaft comprising a hydraulic torque converter having an impeller connected to the driving shaft and a driven rotor, a planetary gear chain including a sun gear connected to the driving shaft, a planet carrier connected to the rotor, and a ring gear, and friction brake means connected to said gear carrier.

7. A transmission for connecting a driving shaft to a driven shaft comprising, a hydraulic torque converter having an impeller connected to the driving shaft and a driven rotor, a planetary gear chain including a sun gear connected to the driving shaft, a planet carrier connected to the rotor, and a ring gear, and friction brake means associated with the gear carrier and the ring gear to brake either of them at will.

8. A transmission for connecting a driving shaft to a driven shaft comprising, a hydraulic torque converter having an impeller connected to the driving shaft and a driven rotor, a planetary gear chain including a sun gear connected to the driving shaft, a planet carrier connected to the rotor, and a ring gear, shiftable clutch means for connecting the driven shaft selectively to the gear carrier or to the ring gear, and a brake connected to the gear carrier.

9. A transmission for connecting a driving shaft to a driven shaft comprising, a hydraulic torque converter having an impeller connected to the driving shaft and a driven rotor, a planetary gear chain including a sun gear connected to the driving shaft, a planet carrier connected to the rotor, and a ring gear, shiftable clutch means for connecting the driven shaft selectively to the gear carrier or to the ring gear, and a brake engageable with the ring gear to hold it for reverse drive.

10. A transmission for connecting a driving shaft to a driven shaft comprising a hydraulic torque converter having an impeller connected to the driving shaft and a driven rotor, a planetary gear chain including a sun gear connected to the driving shaft, a planet carrier connected to the rotor, and a ring gear, shiftable clutch means for connecting the driven shaft selectively to the gear carrier or to the ring gear, and separate brake means associated with the ring gear and the gear carrier respectively.

11. A transmission for connecting a driving shaft to a driven shaft comprising, a hydraulic torque converter having an impeller connected to the driving shaft and a driven rotor, a planetary gear chain including a sun gear connected to the driving shaft, a planet carrier connected to the rotor, and a ring gear, shiftable clutch means for connecting the driven shaft selectively to the gear carrier or to the ring gear, a friction brake surrounding and engageable with the ring gear, and a friction brake connected to the gear carrier.

12. A transmission comprising coaxial driving and driven shafts journaled together at their ends, a hydraulic torque converter mounted on said driving shaft and including an impeller connected to the driving shaft and a driven rotor mounted on a sleeve rotatable on the driving shaft, a planetary gear chain mounted on the driving shaft and including a sun gear connected to the driving shaft, a gear carrier connected to said sleeve and a ring gear, clutch means on the ring gear and gear carrier, clutch means on the driven shaft selectively engageable with either of the first named clutch means, and brakes to brake the ring gear or the gear carrier.

13. A transmission comprising a hydraulic torque converter having a vaned impeller, a vaned rotor and a vaned stator, a differential gear chain having one element connected to said impeller and another element connected to said rotor, and a second gear chain having a driving element connected to a third element of said first gear chain and including shifting means for varying the driving connections therethrough, and brake means associated with said other element.

14. A transmission for connecting a driving shaft to a driven shaft comprising a hydraulic torque converter having an impeller connected to the driving shaft and a driven rotor, a planetary gear chain having one element connected to the driving shaft and another element connected to said rotor, a second gear chain for selectively connecting the driven shaft to a third element of said planetary gear chain, and means operable at will for directly connecting the driving and driven shafts.

15. A transmission for connecting a driving shaft to a driven shaft comprising a hydraulic torque converter having an impeller connected to the driving shaft and a driven rotor, a planetary gear chain having one element connected to the driving shaft and another element connected to said rotor, a gear connected to a third element of the gear chain, a lay shaft having a plurality of gears thereon one of which meshes with said last named gear, gears on said driven shaft meshing with the gears on said lay shaft respectively, clutch means to selectively connect said last named gears to the driven shaft, and a clutch for directly connecting the driving and driven shafts.

16. A transmission for connecting a driving shaft to a driven shaft comprising a hydraulic torque converter having an impeller connected to the driving shaft and a driven rotor, a planetary gear chain having a gear carrier, a sun gear connected to the driving shaft and a ring gear connected to said rotor, a friction brake engageable with the ring gear to brake the ring gear and the rotor, a gear connected to the gear carrier, a gear chain driven by said last named gear and including shiftable means for selectively connecting the last named gear to the driven shaft through different driving connections, and a clutch for directly connecting the driving and driven shafts at will.

ADIEL Y. DODGE.